R. E. HELLMUND.
CONTROL SYSTEM.
APPLICATION FILED FEB. 7, 1916.
1,354,188.
Patented Sept. 28, 1920.
4 SHEETS—SHEET 1.
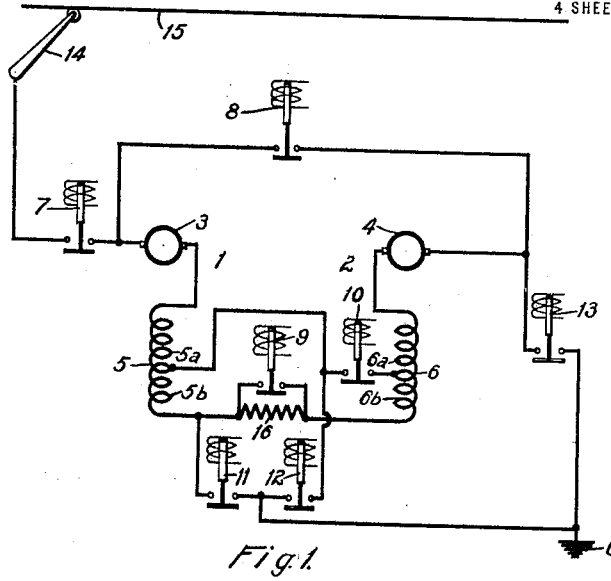
Fig. 1.
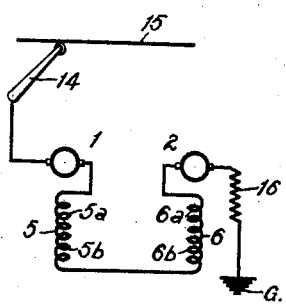
Fig. 3.
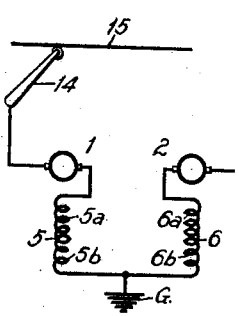
Fig. 5.
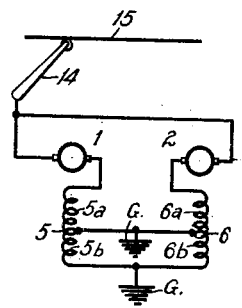
Fig. 6.
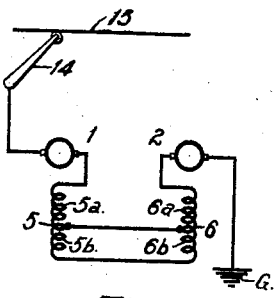
Fig. 4.
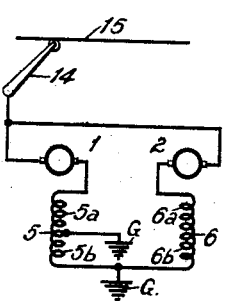
Fig. 7.
Fig. 2.
WITNESSES:
R. J. Fitzgerald
W. B. Wells.
INVENTOR
Rudolf E. Hellmund.
BY
ATTORNEY

R. E. HELLMUND.
CONTROL SYSTEM.
APPLICATION FILED FEB. 7, 1916.

1,354,188.

Patented Sept. 28, 1920.
4 SHEETS—SHEET 2.

WITNESSES:
R. J. Fitzgerald
W. B. Wells

INVENTOR
Rudolf E. Hellmund.
BY
Wesley G. Carr
ATTORNEY

R. E. HELLMUND.
CONTROL SYSTEM.
APPLICATION FILED FEB. 7, 1916.
1,354,188.
Patented Sept. 28, 1920.
4 SHEETS—SHEET 3.
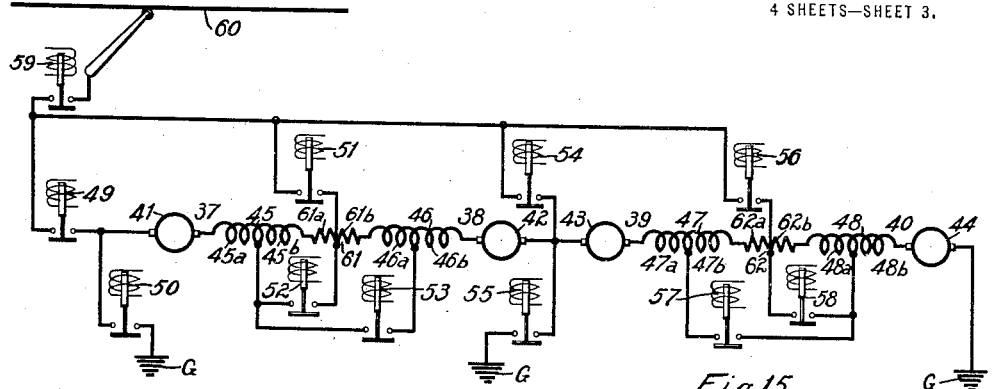
Fig. 15.
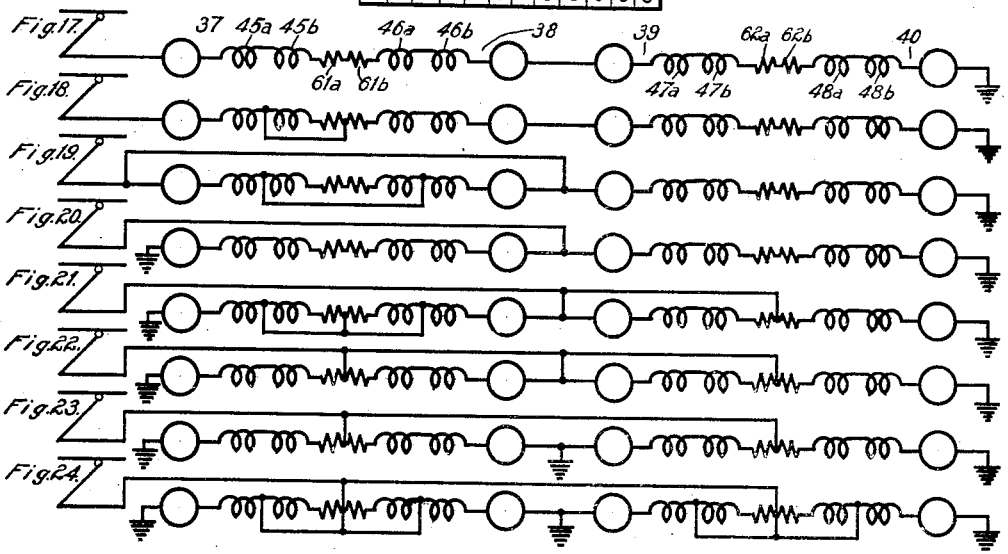
WITNESSES:
R. J. Fitzgerald.
W. B. Wells.
INVENTOR
Rudolf E. Hellmund.
BY
Wesley G. Carr
ATTORNEY

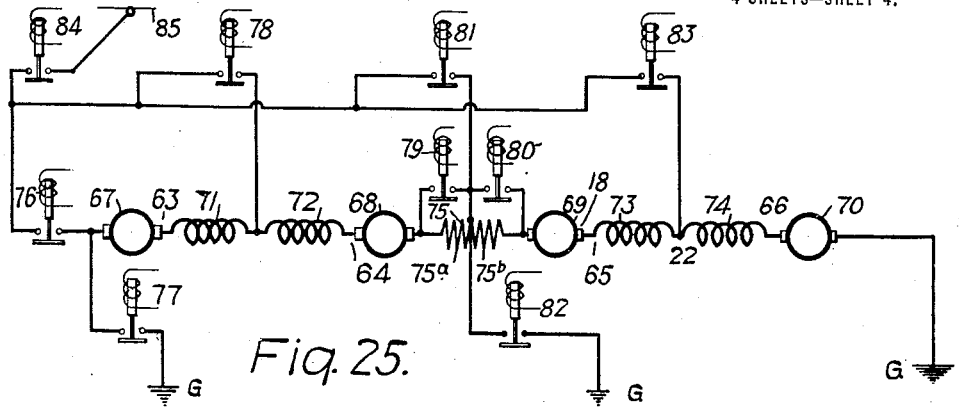
Fig. 25.
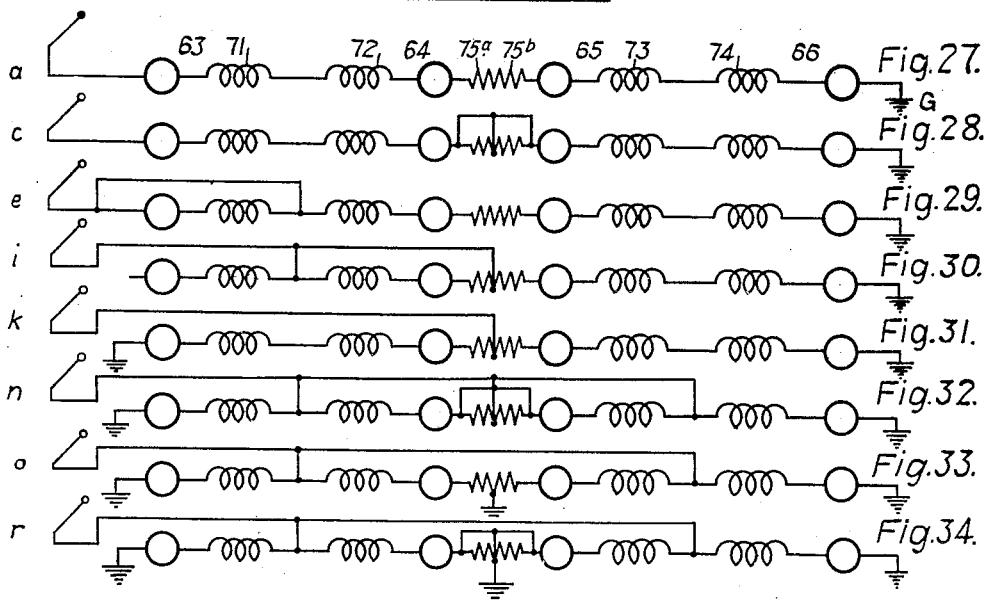

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,354,188.  Specification of Letters Patent.  Patented Sept. 28, 1920.

Application filed February 7, 1916. Serial No. 76,600.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems, of which the following is a specification.

My invention relates to control systems for dynamo-electric machines and particularly to control systems for motor equipments that are adapted for the propulsion of electric railway cars or locomotives.

One of the objects of my invention is to provide an improved and simplified means for controlling the operation of a plurality of electric railway motors or similar driving units and establishing so-called field-control connections for the motors through the agency of a minimum number of switches.

Another object of my invention is to provide a system for controlling the operation of a plurality of electric motors that are permanently connected in series-circuit relation, whereby the motors are connected in parallel-circuit arrangement while effecting reversal in the direction of the flow of current through a portion of the motors and also securing field control by suitable adjustments of the field-magnet windings.

A further object of my invention is to provide a control system of the above-indicated character in which a resistor shall be inserted in circuit with each motor at the time the current is reversed therethrough.

Figure 8:
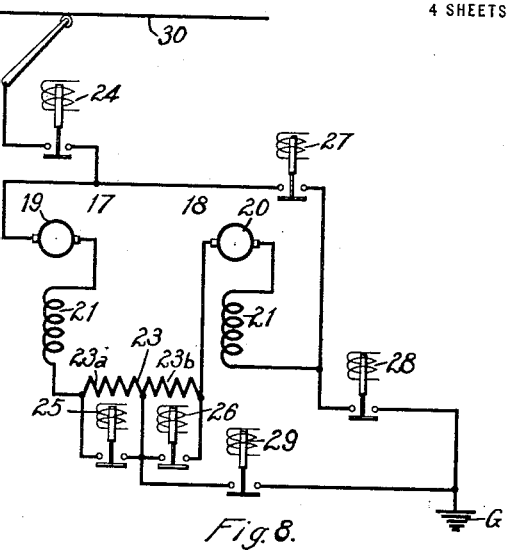
Figure 9:
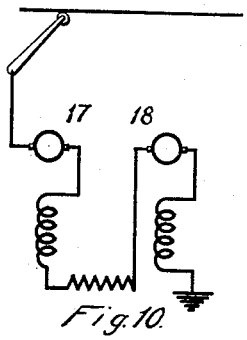
Figures 10, 11, 12:
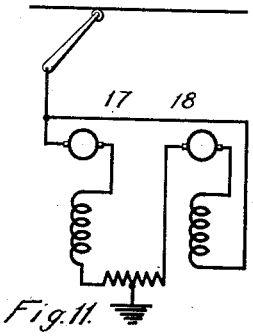
Figure 13:
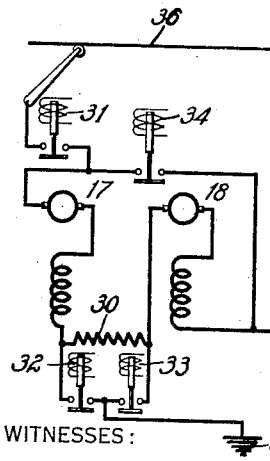
Figure 14:
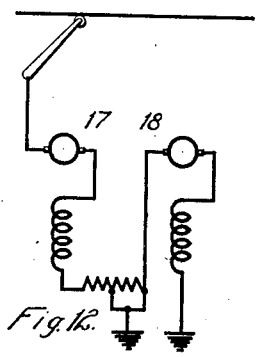

In the accompanying drawings illustrating my invention, Figure 1 is a diagrammatic view of my preferred system of control for a two-motor equipment; Fig. 2 is a sequence chart indicating the positions of the various switches in the various operative positions of the motors in the system shown in Fig. 1; Figs. 3 to 7, inclusive, are simplified diagrammatic views of the motor circuits in the various operative positions of the motors; Fig. 8 is a diagrammatic view of a control system similar to the system illustrated in Fig. 1 but employing a less number of switches; Fig. 9 is a sequence chart for the system illustrated in Fig. 8; Figs. 10, 11 and 12 embody simplified diagrammatic views of the motor circuits in the system illustrated in Fig. 8; Fig. 13 is a modified system employing one less switch than the system illustrated in Fig. 8; Fig. 14 is a sequence chart for the system illustrated in Fig. 13; Fig. 15 is a diagrammatic view of my preferred system of control for a four-motor equipment; Fig. 16 is a sequence chart of the system illustrated in Fig. 15; Figs. 17 to 24, inclusive are simplified diagrammatic views of the motor circuits for the system illustrated in Fig. 15; Fig. 25 is a diagrammatic view of a modified system for a four-motor equipment; Fig. 26 is a sequence chart for the system illustrated in Fig. 25; Figs. 27 to 34, inclusive, are simplified diagrammatic views of the motor circuits for the system illustrated in Fig. 25.

Referring to Figs. 1 to 7, inclusive, of the drawings, two motors 1 and 2 are respectively provided with armatures 3 and 4 and with field-magnet windings 5 and 6 which are divided into windings $5^a$ and $5^b$, and $6^a$ and $6^b$. Unit switches 7 to 13, inclusive, are provided for controlling the operation of the motors and for completing a circuit from a trolley conductor 15 through the motors to the ground G. A resistor 16 is initially placed in series-circuit relation with the two motors 1 and 2.

Referring to Fig. 8 of the drawing, two motors 17 and 18, embodying armatures 19 and 20 and field magnet windings 21 and 22, are initially in series-circuit relation with a resistor 23 which is divided into portions $23^a$ and $23^b$. Unit switches 24 to 29, inclusive, are provided for controlling the operation of the motors and for connecting the same to ground G and to a trolley conductor 30.

As the control system illustrated in Fig. 13 is a modification of the system illustrated in Fig. 8, the motors in Fig. 13 will be designated by reference characters similar to those used in Fig. 8. A resistor 30 is initially placed in series-circuit relation with the two motors and unit switches 31 to 35, inclusive, which are provided for controlling the operation of the motors and for connecting the same to a trolley conductor 36 and to ground G.

Referring to Fig. 15, motors 37, 38, 39 and 40 are respectively provided with armatures 41, 42, 43 and 44 and field-magnet windings 45, 46, 47 and 48. The field-magnet windings 45 to 48, inclusive, are divided into windings $45^a$ and $45^b$, $46^a$ and $46^b$, $47^a$ and $47^b$, and $48^a$ and $48^b$, respectively. Unit switches 49 to 59, inclusive, are adapted to control the operation of the motors and to connect the same to a trolley conductor 60 and to ground G. A resistor 61, which is composed of separate resistors $61^a$ and $61^b$, is disposed between the windings 45 and 46, and a resistor 62, which is composed of separate resistors $62^a$ and $62^b$, is disposed between the windings 47 and 48.

Referring to Fig. 25, motors 63, 64, 65 and 66 are respectively provided with armatures 67, 68, 69 and 70 and with field-magnet windings 71, 72, 73 and 74. A composite resistor 75, composed of resistors $75^a$ and $75^b$, is disposed between the armatures 68 and 69. Unit switches 76 to 84, inclusive, are provided for controlling the operation of the motors and for connecting the same to ground G and trolley conductor 85.

As the control systems illustrated in this application are very simple in character and as schematic control, charts and motor control diagrams are included with each system, it is deemed unnecessary to include controller diagrams. The diagrams would be very simple and would only tend to needlessly multiply the drawings.

With the system in the position shown in Fig. 1, the motors 1 and 2 may be accelerated through positions $a$ to $j$, inclusive, as follows: In the starting position $a$, unit switches 7 and 13 are operated to complete a circuit from the trolley conductor 15 through motors 1 and 2 and resistor 16 in series to the ground G, as shown in Fig. 3; in position $b$, the resistor 16 is short-circuited by means of the unit switch 9; and in position $c$, the unit switch 10 is operated to short-circuit windings $5^b$ and $6^b$ and thus leave the motors 1 and 2 energized by the windings $5^a$ and $6^a$, as shown in Fig. 4 of the drawings. Positions $d$ and $e$ are transition positions for changing from series to parallel operation. In position $d$, switch 11 is operated and in position $e$, switches 9, 10 and 13 are released, thus, leaving the motor 1 connected directly across the power circuit, as shown in Fig. 5. In position $f$, switch 8 is operated to connect motors 1 and 2 in parallel across the power circuit. In the latter position, the current is reversed through the motor 2, while the resistor 16 is in circuit therewith. In position $g$, switch 9 is operated to short-circuit the resistor 16. In position $h$, switch 12 is operated and a circuit completed as illustrated in Fig. 7. In position $i$, switch 10 is operated and a circuit completed as illustrated in Fig. 6. In position $j$, switch 11 is released to connect the motors 1 and 2 in parallel across the power circuit, the field windings $5^b$ and $6^b$ being short-circuited. In the above positions, $a$ and $f$ are starting positions, $b$, $c$, $g$ and $j$ are running positions and $d$, $e$, $h$ and $i$ are transition positions.

Referring to Figs. 8 and 9 of the drawing, a system is shown which is operated by nine steps $a$ to $i$, inclusive. The positions $a$, $b$, $g$ and $h$ are starting positions; $c$ and $i$ are running positions and $d$, $e$ and $f$ are transition positions. With the system in position shown in Fig. 8, the motors 17 and 18 may be accelerated through the positions $a$ to $i$, inclusive, as follows: In position $a$, switches 24 and 28 are operated to complete a circuit from the trolley conductor 30 through the motor 17, resistor 23 and motor 18, as shown in Fig. 10 of the drawings. In position $b$, unit switch 26 is operated to short-circuit the resistor $23^b$ and in position $c$, the unit switch 25 is operated to short-circuit the resistor $23^a$. In position $d$, the unit switch 25 is released and the same set of switches operated as in position $b$. In position $e$, the switch 29 is operated and a circuit completed from the trolley conductor 30 to ground G, as shown in Fig. 12 of the drawings. In position $f$, switches 26 and 28 are released and a circuit completed from the trolley conductor 30 through motor 17 and resistor $23^a$ to ground G. In position $g$, the switch 27 is operated and a circuit completed, as illustrated in Fig. 11. In position $h$, the switch 26 is operated to short-circuit the resistor $23^b$ and in position $i$, the switch 25 is operated to short-circuit the resistor $23^a$.

As the control system illustrated in Fig. 13 is similar to the system illustrated in Fig. 8, Figs. 10, 11 and 12 will be used in describing the circuits completed in both systems.

The system illustrated in Fig. 13 is operated through six positions, namely, $a$ to $f$, inclusive. In position $a$, the unit switches 31 and 35 are operated and a circuit completed as illustrated in Fig. 10. In position $b$, the unit switch 33 is operated to connect the motor 17 through the resistor 30 to ground G. In position $c$, switch 32 is operated and switch 35 is released to include the resistance 30 in the circuit of motor 17. In position $d$ which is a transition position, the unit switch 33 is released. In position $e$, the unit switch 34 is operated and the two motors are connected in parallel between the trolley conductor 36 and the ground G. In the last position, the current through the motor 18 is reversed while the resistance 30 is included in circuit therewith. In position $f$, the unit switch 33 is operated and the resistor 30 is excluded from the circuit of motor 18.

The motors 37 to 40, inclusive, illustrated in Fig. 15 are controlled in 24 steps, namely $a$ to $x$, inclusive, by means of the unit switches 49 to 59, inclusive, as follows: in position $a$, the unit switches 49 and 59 are operated to complete a circuit from the trolley conductor through the motor 37, resistor 61, motor 38, motor 39, resistor 62 and the motor 40 to ground G, as illustrated in Fig.

17. In position $b$, the unit switch 52 is operated to short-circuit the field-magnet winding $45^b$ and the resistor $61^a$ and thus complete a circuit as illustrated in Fig. 18. In position $c$, the unit switch 58 is operated to short-circuit the resistor $62^b$, and the field winding $48^a$. In position $d$, the unit switch 53 is operated to short-circuit the resistor $61^b$ and field winding $46^a$. In position $e$, the unit switch 57 is energized to short-circuit the winding $47^b$ and the resistor $62^a$. In position $f$, the unit switches 57 and 58 are released and field windings $47^b$ and $48^a$ and the resistors $62^a$ and $62^b$ are inserted in the circuit of the motors. In position $g$, the unit switch 54 is operated and a circuit completed as illustrated in Fig. 19. In position $h$, the unit switches 52 and 53 are released to break the short-circuit around the field windings $45^b$ and $46^a$ and the resistors $61^a$ and $61^b$. In position $i$, the unit switch 49 is released and in position $j$, the unit switch 50 is operated to connect the four motors in series-parallel-circuit relation, as illustrated in Fig. 20. In position $k$, the unit switch 52 is operated to short-circuit the field windings $45^b$ and the resistor $61^a$. In position $l$, the unit switch 58 is operated to short-circuit the field winding $48^a$ and the resistor $62^b$. In position $m$, the unit switch 53 is operated to short-circuit the resistor $61^b$ and the field winding $46^a$. In position $n$, the unit switch 57 is energized to short-circuit the field winding $47^b$ and the resistor $62^a$. In position $o$, the unit switches 57 and 58 are released and field windings $47^b$ and $47^a$ and the resistors $62^a$ and $62^b$ are inserted in the circuit of the motors 39 and 40. In position $p$, the unit switch 56 is operated and a circuit completed as illustrated in Fig. 21. In position $q$, the unit switches 52 and 53 are released and the resistors $61^a$ and $61^b$, and field windings $45^b$ and $46^a$ are inserted in circuit with the motors 37 and 38. In position $r$, the unit switch 51 is operated and a circuit is completed as illustrated in Fig. 22. In position $s$, the unit switch 54 is released and in position $t$, the unit switch 55 is operated to connect the motors in parallel-circuit relation, as shown in Fig. 23. In positions $u$, $v$, $w$ and $x$, the unit switches 52, 58, 53 and 57 are operated to short-circuit the field windings $45^b$, $46^a$, $47^b$ and $48^a$ and the resistors $61^a$, $61^b$, $62^a$ and $62^b$ and thus complete a circuit as illustrated in Fig. 24.

In the above system, $a$, $b$, $c$, $d$, $j$, $k$, $l$, $m$, $t$, $u$, $v$ and $w$ are starting positions; $e$, $n$, and $x$ are running positions; and $f$, $g$, $h$, $i$, $o$, $p$, $q$, $r$ and $s$ are transition positions.

In the system illustrated in Fig. 15, either a portion of the field windings of the motors or a portion of the adjacent resistor may be eliminated without disturbing the operation of the system. As, for example, in the circuit of the motor 37, either the winding $45^b$, or the resistor $61^a$ may be eliminated.

Referring to Fig. 25, the motors 63 to 66, inclusive, may be controlled by the unit switches 76 to 84, inclusive, in 18 steps $a$ to $r$, inclusive, as follows: In position $a$, the unit switches 76 and 84 are operated to complete a circuit from the trolley conductor 85 through the motors 63 to 66, inclusive, as illustrated in Fig. 27. In positions $b$ and $c$, the unit switches 79 and 80 are operated to short-circuit the resistors $75^a$ and $75^b$ and to complete a circuit as illustrated in Fig. 28. In position $d$, the unit switches 79 and 80 are released and a circuit completed as illustrated in Fig. 27. In position $e$, the unit switch 78 is operated and a circuit completed as illustrated in Fig. 29. In positions $f$ and $g$, the unit switch 76 is released to break the connection between the armature 67 and the trolley conductor 85, and the unit switches 79 and 80 are operated to short-circuit the resistors $75^a$ and $75^b$. In position $h$, the unit switches 79 and 80 are released and the resistors $75^a$ and $75^b$ are included in the circuit of the motors 64, 65 and 66 and in position $i$, the unit switch 81 is operated to complete a circuit as illustrated in Fig. 30. In position $j$, the unit switch 78 is released and in position $k$, the unit switch 77 is operated to complete a circuit as illustrated in Fig. 31. In the positions $l$ and $m$, the unit switches 79 and 80 are operated to short-circuit the resistors $75^a$ and $75^b$. In position $n$, the unit switches 78 and 83 are operated to complete a circuit as illustrated in Fig. 32. In position $o$, the unit switches 79, 80, and 81 are released and in position $p$, the unit switch 82 is operated to complete a circuit as illustrated in Fig. 33. In positions $q$ and $r$, the switches 79 and 80 are operated to short-circuit the resistors $75^a$ and $75^b$ and complete a circuit as illustrated in Fig. 34. In the above system, $a$, $b$, $e$, $f$, $g$, $k$, $l$, $p$ and $q$ are starting positions; $c$, $m$ and $r$ are running positions and $d$, $h$, $i$, $j$, $n$ and $o$ are transition positions.

In operating the control systems above described, the current flow through one or two of the motors is reversed when a change is made from series to parallel operation and, in each instance, a resistor is included in circuit with the motor or motors through which the current is reversed.

It is evident that modifications in the systems set forth may be effected without departing from the spirit and scope of my invention, and I desire that only such limitations shall be imposed as are indicated in the appended claims.

I claim as my invention:

1. In a control system, the combination with a plurality of motors having armature and field windings and a resistor initially in series with said motors, of means for reversing the current through a portion of said motors with said resistor in series therewith and a switch for simultaneously short circuiting a portion of a plurality of said field windings.

2. The method of operating a plurality of dynamo-electric machines in series, series-parallel and parallel relations from a supply circuit that consists in initially connecting the machines in series relation and then short-circuiting portions of the field windings of certain machines, connecting the first supply-circuit conductor to the electrical mid-point of the motor circuit, both ends thereof being at that time connected to the second supply-circuit conductor, again short-circuiting said field-winding portions, successively connecting the electrical mid-points of the parallel circuits to said first conductor, and transferring the connection of the first-mentioned mid-point to said second conductor.

3. In a control system, the combination with two motors having armature and field windings, and a resistor, of means for short-circuiting portions of said field windings, means for reversing the current flowing through one of said motors, and means for inserting the resistor in the circuit of said motor when the current is reversed therethrough.

4. In a control system, the combination with two motors having armature and field windings, a power circuit, and a resistor initially in series with said motors, of means for connecting the motors in parallel-circuit relation across said power circuit, one of said motors being in series with said resistor and having the current flowing through it in a reverse direction and a switch for excluding a portion of each of said field windings from circuit when the motors are in series and in parallel-circuit relation.

5. In a control system, the combination with two motors having armature and field windings, and a power circuit, of means for connecting said motors in series or in parallel-circuit relation across said power circuit, one of said motors having the current reversed therethrough when connected in parallel with the other motor, and a single switch for simultaneously short-circuiting portions of the field windings to accelerate the motors when the same are in series or in parallel-circuit relation.

6. In a control system, the combination with a power circuit, two motors having armature and field windings, and a resistor connected in series-circuit relation with said motors across said power circuit, the field windings of the motors being adjacently disposed, of means for operating the motors in series or in parallel-circuit relation, a switch for short-circuiting a portion of windings of each motor when the motors are in series or in parallel-circuit relation, and means for reversing the current through one of said motors with the same in series with said resistor when the motors are placed in parallel-circuit relation across the power circuit.

7. In a control system, the combination with two motors having armature and field windings, a power circuit and a resistor initially in series with said motors, of switches and circuit connections for short-circuiting said resistor, for short-circuiting a portion of the field windings of said motors, for connecting one of said motors directly across said power circuit, for connecting a second motor across said power circuit in series with said resistor with the current flowing through the same in a reversed direction, for short-circuiting said resistor while the motors are connected in parallel across said power circuit and for short-circuiting a portion of the field windings while the motors are connected in parallel across said power circuit.

8. In a control system, the combination with two motors having armature and field windings, a resistor, and a power circuit, the two motors having their field windings adjacently disposed, of means for connecting said motors in series and in parallel-circuit relation across said power circuit, a switch for short-circuiting portions of each motor field winding when the motors are operating in series or in parallel-circuit relation, and means for reversing the current through one of said motors and inserting the resistor in circuit therewith when the motors are connected in parallel across said power circuit.

9. In a control system, the combination with two motors having armature and field windings, a resistor and a power circuit, the motors having their field windings adjacently disposed and the motors being initially connected with said resistor across said power circuit, of means for short-circuiting portions of said field windings, means for connecting one of said motors directly across the power circuit, means for connecting the second motor in series with said resistor across said power circuit and with the current flowing in a reverse direction therethrough.

10. In a control system, the combination with a plurality of motors having armature and field windings, and a plurality of resistors, of means comprising switches for reversing the current through a portion of said motors and for simultaneously inserting a resistor in circuit with each motor through which the current is reversed and a switch for short-circuiting a portion of a plurality of said field windings.

11. In a control system, the combination with four motors having armature and field windings, a power circuit, and two resistors, of means for connecting said motors in series or in parallel-circuit relation across said power circuit, means for reversing the current flow through two of the motors when the same are connected in parallel-circuit relation, means for inserting one of said resistors in the circuit of each motor energized by a reversed current, and a switch associated with each resistor for short-circuiting the resistor and a portion of the field windings disposed adjacent thereto.

12. In a control system, the combination with four motors having armature and field windings, two resistors and a power circuit, of means for connecting said motors in series or parallel-circuit relation to said power circuit through a series of steps, two of said motors having said resistors in circuit therewith and the current reversed through them when the motors are connected in parallel across said power circuit, and a switch associated with each resistor for short-circuiting the resistor and a portion of the field windings adjacent thereto.

13. In a control system, the combination with a plurality of motors having armature and field windings, a plurality of resistors, and a power circuit, the motors being arranged in pairs with their field windings adjacently disposed and one of said resistors being interposed between the field windings of each pair, of means for connecting said motors in parallel or series-circuit relation across said power circuit, means to simultaneously short-circuit portions of each field winding and the resistor included in each pair of motors while the latter are operating in series or in parallel-circuit relation, means for reversing the current through a portion of said motors, and means for inserting a resistor in circuit with each motor at the time the current is reversed therethrough.

14. In a control system, the combination with a plurality of motors the circuits of which are divided into two sections, of means for operating the motors in series parallel and parallel-circuit relation, and means for inserting and then excluding a section, comprising a resistor and a field-winding portion, of each motor circuit when the same are operated in series, in series-parallel and in parallel-circuit relation.

15. In a control system, the combination with a plurality of motors the circuits of which are divided into two sections, of means for operating the motors in series and parallel-circuit relation and means for inserting and then excluding a section, comprising a resistor and a field-winding portion, of the circuit of each motor when the same are operating in series and in parallel-circuit relation.

16. In a control system, the combination with a plurality of motors each embodying an armature and a divided field-magnet winding, of means for operating said motors in series, series-parallel and parallel-circuit relation, and means for inserting and then short-circuiting a portion of the field-magnet windings of each motor when the same are operated in series, in series-parallel and parallel-circuit relation.

17. In a control system, the combination with a plurality of motors each embodying an armature and divided field-magnet windings, and a plurality of resistors, of means for operating the motors in series, in series-parallel and parallel-circuit relation and means for inserting and then short-circuiting the resistors and a portion of the field windings when the motors are in series, series-parallel and parallel-circuit relation.

18. The method of operating a plurality of electric motors from series-parallel to parallel relation from a supply circuit that consists in weakening the field excitation of one set of motors, connecting the mid-point of the circuit including the other set to one of the supply-circuit conductors, connecting the mid-point of the other circuit including said one set to that conductor, and then transferring the original point of connection of the motor circuit with that conductor to the other supply-circuit conductor.

19. The method of operating four permanently series-connected motors from a supply circuit, the electrical mid-point of the motor circuit being connected to the positive supply-circuit conductor and the ends of said circuit being connected to the negative conductor, that consists in successively weakening the field excitation of one pair of motors, connecting the mid-point of the circuit including the other pair to the positive supply-circuit conductor, connecting the mid-point of the other circuit including said one pair to that conductor, and then transferring the connection of the first-mentioned mid-point to the negative conductor.

In testimony whereof, I have hereunto subscribed my name this 27th day of Jan. 1916.

RUDOLF E. HELLMUND.